(12) United States Patent
Tsay et al.

(10) Patent No.: US 11,141,806 B2
(45) Date of Patent: Oct. 12, 2021

(54) AUTOMATIC NUT TAPPING EQUIPMENT

(71) Applicant: National Sun Yat-sen University, Kaohsiung (TW)

(72) Inventors: Der-Min Tsay, Kaohsiung (TW); Guan-shyong Hwang, Kaohsiung (TW); Tsung-Chun Lin, Kaohsiung (TW); Wei-Ming Chen, Kaohsiung (TW)

(*) Notice: Subject to any disclaimer, the term of this patent is extended or adjusted under 35 U.S.C. 154(b) by 0 days.

(21) Appl. No.: 16/908,750

(22) Filed: Jun. 23, 2020

(65) Prior Publication Data

US 2021/0237182 A1    Aug. 5, 2021

(51) Int. Cl.
*B23G 1/18*     (2006.01)
*B23Q 5/22*     (2006.01)

(52) U.S. Cl.
CPC ............ *B23G 1/185* (2013.01); *B23Q 5/225* (2013.01); *Y10T 408/47* (2015.01)

(58) Field of Classification Search
CPC ........ B23G 1/185; B23Q 5/225; Y10T 408/47
See application file for complete search history.

(56) References Cited

U.S. PATENT DOCUMENTS

| | | | | |
|---|---|---|---|---|
| 2,703,894 A | * | 3/1955 | Goldberg | B23G 1/185 408/7 |
| 2,811,876 A | * | 11/1957 | Batchelder | B23G 1/185 408/7 |
| 3,015,116 A | * | 1/1962 | Pethybridge | B23G 5/12 470/182 |
| 3,056,983 A | * | 10/1962 | Devereux | B23G 1/185 408/68 |
| 3,358,306 A | * | 12/1967 | Haralampiev | B23G 5/06 408/64 |
| 3,477,077 A | * | 11/1969 | Meerendonk | B23Q 7/00 408/70 |
| 3,668,726 A | * | 6/1972 | Shinjo | B23G 1/185 470/98 |
| 2019/0381588 A1 | * | 12/2019 | Vescovini | B23G 1/48 |

FOREIGN PATENT DOCUMENTS

| | | |
|---|---|---|
| CN | 2338120 Y | 9/1999 |
| GB | 252744 A * | 5/1927 ............ B23G 1/185 |

* cited by examiner

*Primary Examiner* — Eric A. Gates

(57) ABSTRACT

An automatic nut tapping equipment is provided. The automatic nut tapping equipment includes a tap rotating mechanism, a nut clamping mechanism, an axial transmission mechanism, and a nut placing slot. The tap rotating mechanism includes a tap rotary motor and a tap, wherein the tap is driven by the tap rotary motor. The nut clamping mechanism includes a clamping assembly and a sliding rail, wherein the clamping assembly is disposed on the sliding rail and is configured for clamping a to-be-tapped nut to restrict the to-be-tapped nut from rotating. The axial transmission mechanism controls the clamping assembly to axially translate one pitch in response to the tap rotating one revolution, such that a forward nut-tapping motion and a backward nut-retracting motion are performed by the nut clamping mechanism. The nut placing slot is configured to arrange and control the dropping of another to-be-tapped nut.

10 Claims, 10 Drawing Sheets

AUTOMATIC NUT TAPPING EQUIPMENT

CROSS REFERENCE TO RELATED APPLICATIONS

This application claims the priority of Taiwan Patent Application No. 109103231, filed on Feb. 3, 2020, titled "AUTOMATIC NUT TAPPING EQUIPMENT", and the disclosure of which is incorporated herein by reference.

FIELD OF INVENTION

The present disclosure relates to the field of tapping equipment, and more particularly, to an automatic nut tapping equipment.

BACKGROUND OF INVENTION

In the existing floating nut tapping equipment, the tap is welded on the tap shank. The tap constantly rotates in one direction to tap the nut, and then the tapped nut passes through the tap shank and withdraws the tap shank, such that a continuous tapping process is achieved. There is a gap between the tap shank and the hole of the nut. Take M8×1.25 nut as an example. The diameter of the hole of the nut is ϕ6.84, the diameter of the tap shank is ϕ6.1, and therefore, the gap is 0.74 mm. The length of the tap shank is 200 mm, and the distance between each side of the tap shank and the hole of the nut is 0.37 mm, such that the tap shank tilts by 12.7 angular minutes in entire row of nuts. Therefore, when a rotation of a tapping process is processed, the tap is tilted and vibrated, thereby resulting in a hole expansion during the tapping process. Then, when the nut enters the thread of tapping, the tap shank vibrates, thereby affecting the accuracy of the tapping. The tilted tap results in vibration during a rotation, such that the accuracy of the tapping is affected. During the tapping process, the tapping is driven to rotate by a back sleeve. Due to a torsional rigidity of the tap shank, such as the torsional rigidity of M8×1.25 nut is 6.2 o/m, there is an irregularity in the internal thread of the nut. Different torques cause a large difference in the torsional rigidity of the tap, so the nut causes a circumferential position difference from the driving source to the end of the tap.

In addition, the tap is welded on the tap shank. During the tapping process, the tap is affected by the torsional rigidity of the tap shank, which causes the irregularity in the internal thread of the nut. Furthermore, because the tap is welded on the tap shank, a center-welding process with a precision jig is required for each replacement of the tap. Once there is an error in the center-welding process, the accuracy of the tapping for the nut is greatly affected.

There is a reciprocating tapping equipment in the prior art. The tap taps the nut from top to bottom and retracts from bottom to top. When the tap taps, the tap often passes through the nut. In this way, when the tap retracts, the last pitch of cutting edge on the tap does not match the internal thread of the tapped nut. That causes a secondary tapping, so as to damage the internal thread of the nut. In addition, during the upward and downward movement of the tap, the downward speed of the tap is not consistent with the upward speed of the tap, the internal thread is damaged.

Therefore, it is necessary to provide an automatic nut tapping equipment to solve the problems of the prior art.

SUMMARY OF INVENTION

The object of the present disclosure is to provide an automatic nut tapping equipment in which the tapping of the nut is completed by a nut clamping mechanism moving back and forth in coordination with a tap rotating mechanism. The tap is rigidly clamped by the tap rotating mechanism, and the back and forth movement of the tap is not required. The center axis of the tap is precisely aligned with the center axis of a rigid clamping member of the tap rotating mechanism and the tap has a high torsional rigidity. In this way, during the nut tapping process, the tap vibration and the hole expansion caused by the tap vibration do not occur. During the tapping, the nut is restricted from rotating and be axially moved automatically with the rotation of the tap without a precise control process to be needed, then a nut with a high-quality internal thread can be completed. A mold is driven to move back and forth toward the tap by a linear moving mechanism, and when the nut is moved to the last pitch of cutting edge on the tap, the tap reversely rotates to prevent a secondary tapping. Because the rotary motion is independent of the linear motion, to replace the mold and to align with the tap are easy, and calibration is convenient. Therefore, when the nut or the tap is changed to another specification, the assembly and the positioning are easy, and which are suitable for mass production. The feeding and the conveying are performed by mechanical mechanisms, and the automatic discharging is performed by a L-shaped lever. Therefore, the present disclosure provides an automatic nut tapping equipment, which has the advantages of high rigidity, high accuracy, and easy calibration.

In order to achieve the aforementioned object of the present disclosure, the present disclosure provides an automatic nut tapping equipment, including: a tap rotating mechanism including a tap rotary motor and a tap, wherein the tap is driven to rotate forward and reverse by the tap rotary motor, the tap is rigidly clamped and is arranged to align a central axis of a to-be-tapped nut, and the tap is driven by the tap rotary motor to perform a rotary motion without a translational axial motion; a nut clamping mechanism disposed opposite the tap, wherein the nut clamping mechanism comprises a clamping assembly and a sliding rail, the clamping assembly is disposed on the sliding rail to axially move forward and backward, and the clamping assembly is configured for clamping the to-be-tapped nut to restrict the to-be-tapped nut from rotating; an axial transmission mechanism coupled to the clamping assembly, wherein the clamping assembly is driven by the axial transmission mechanism to axially translate, and the axial transmission mechanism controls the clamping assembly to axially translate one pitch in response to the tap rotating one revolution, such that a forward nut-tapping motion and a backward nut-retracting motion are performed by the nut clamping mechanism; and a nut placing slot is configured to arrange and control the dropping of another to-be-tapped nut; wherein the nut clamping mechanism comprises a push rod, a lever, a cavity, and a guiding plate; and the push rod is disposed on the clamping assembly, and the push rod is axially moved forward and backward along with the clamping assembly, such that the forward nut-tapping motion and the backward nut-retracting motion are finished, wherein the push rod pushes the to-be-tapped nut into the tap for tapping and stops the dropping of another to-be-tapped nut in the nut placing slot during the forward nut-tapping motion; the lever is disposed on the nut clamping mechanism through a pivot point, an end of the lever slides in the guiding plate, another end of the lever is coupled to the push rod and is axially moved forward and backward along with the clamping assembly, in response to the to-be-tapped nut is tapped and retracted to a front edge of the nut placing slot, a swing of the lever at the pivot point is caused by the guide plate, and then the backward movement of the push rod is speeded, thereby allowing the dropping of another to-be-tapped nut in the nut placing slot, after the dropping of another to-be-tapped nut, the lever is moved forward along with the clamping assembly, and then the push rod is driven to push another to-be-tapped nut moves forward, and the tapped nut in the cavity nut is pushed out of the cavity; the cavity restricts the to-be-tapped nut in the cavity from rotating during tapping, but allows the to-be-tapped nut to move slightly, a front edge of the cavity is provided with an anti-tilt guiding rail, the anti-tilt guiding rail allows dropping of the to-be-tapped nut, and the to-be-tapped nut is pushed into the cavity by the push rod, and the guiding plate comprises a guiding slot for swinging the lever.

In one embodiment of the present disclosure, the tap rotating mechanism uses a high-precision sleeve, a tapered sleeve, a three-jaw or a hydraulic jaw to rigidly clamp the tap.

In one embodiment of the present disclosure, in response to the to-be-tapped nut is moved to the last pitch of cutting edge on the tap during the forward nut-tapping motion, the tap is driven to rotate reversely by the tap rotary motor and the backward nut-retracting motion is performed by the nut clamping mechanism. In one embodiment of the present disclosure, the tap is rigidly clamped and is arranged to align a central axis of a to-be-tapped nut, and the tap is driven by the tap rotary motor to perform a rotary motion without a translational axial motion.

In one embodiment of the present disclosure, the tap rotary motor is configured to drive the tap to rotate in a first direction or a second direction, the tap rotates in the first direction during tapping, and the tap rotates in the second direction during retracting.

In one embodiment of the present disclosure, the axial transmission mechanism comprises a plate cam and a cam driving motor, the plate cam is coupled to a connecting rod, and the plate cam is driven to rotate by the cam driving motor.

In one embodiment of the present disclosure, the nut clamping mechanism further comprises a push rod, an L-shaped lever, a cavity, and a guiding plate, and the push rod is disposed on the clamping assembly, and the push rod is axially moved forward and backward along with the clamping assembly, such that the forward nut-tapping motion and the backward nut-retracting motion are finished, wherein the push rod pushes the to-be-tapped nut into the tap for tapping and stops the dropping of another to-be-tapped nut in the nut placing slot during the forward nut-tapping motion; the L-shaped lever is disposed on the nut clamping mechanism through a pivot point, an end of the L-shaped lever slides in the guiding plate, another end of the L-shaped lever is coupled to the push rod and is axially moved forward and backward along with the clamping assembly, in response to the to-be-tapped nut is tapped and retracted to a front edge of the nut placing slot, a swing of the L-shaped lever at the pivot point is caused by the guide plate, and then the backward movement of the push rod is speeded, thereby allowing the dropping of another to-be-tapped nut in the nut placing slot, after the dropping of another to-be-tapped nut, the L-shaped lever is moved forward along with the clamping assembly, and then the push rod is driven to push another to-be-tapped nut moves forward; the cavity restricts the to-be-tapped nut in the cavity from rotating during tapping, but allows the to-be-tapped nut to move slightly; and the guiding plate comprises a guiding slot for swinging the lever.

As described above, in the present disclosure, the nut clamping mechanism is driven to reciprocate in the same axial through the axial transmission mechanism, and during the reciprocating movement, the nut tapping is completed, and, that is, the internal thread is formed in the nut. Besides, the feeding and discharging of the nut are performed by the L-shaped lever and the push rod coupled with the L-shaped lever, wherein the pushrod can stop the dropping of another to-be-tapped nut during the tapping. Because the tap does not reciprocate and the tapped nut does not pass through the tap shank, the tap is prevented from being tilted, and the accuracy of the nut tapping is effectively improved. Furthermore, the tap does not reciprocate, the tapped nut does not pass through the tap shank, and the length of the tap shank can be shortened and the shaft diameter thereof can be greater. In this way, a higher torsional rigidity is generated during the tapping, thereby the vibration of the tap is avoided/reduced. The shorter and thicker tap shank has high torsional rigidity, such that the rotation delay caused by the rotation deformation can be avoided/reduced and the accuracy of the tapping also can be improved. During the tapping, the nut does not need to completely disengage from the tap but maintain overlapping the last pitch of cutting edge on the tap, and then the tap reversely rotates and the nut retracts to prevent secondary tapping.

DESCRIPTION OF DRAWINGS

In order to make the above content of the present disclosure more comprehensible, the preferred embodiments are described as follows in detail with the accompanying drawings.

DETAILED DESCRIPTION OF PREFERRED EMBODIMENTS

In the following detailed description of the preferred embodiments, reference is made to the accompanying drawings which form a part hereof, and in which is shown by way of illustrating specific embodiments in which the disclosure may be practiced. In this regard, directional terminology, such as "top", "bottom", "front", "back", "left", "right", "inside", "outside", "side", etc., is used with reference to the orientation of the figure(s) being described. As such, the directional terminology is used for purposes of illustration and is in no way limiting.

Figure 1A:
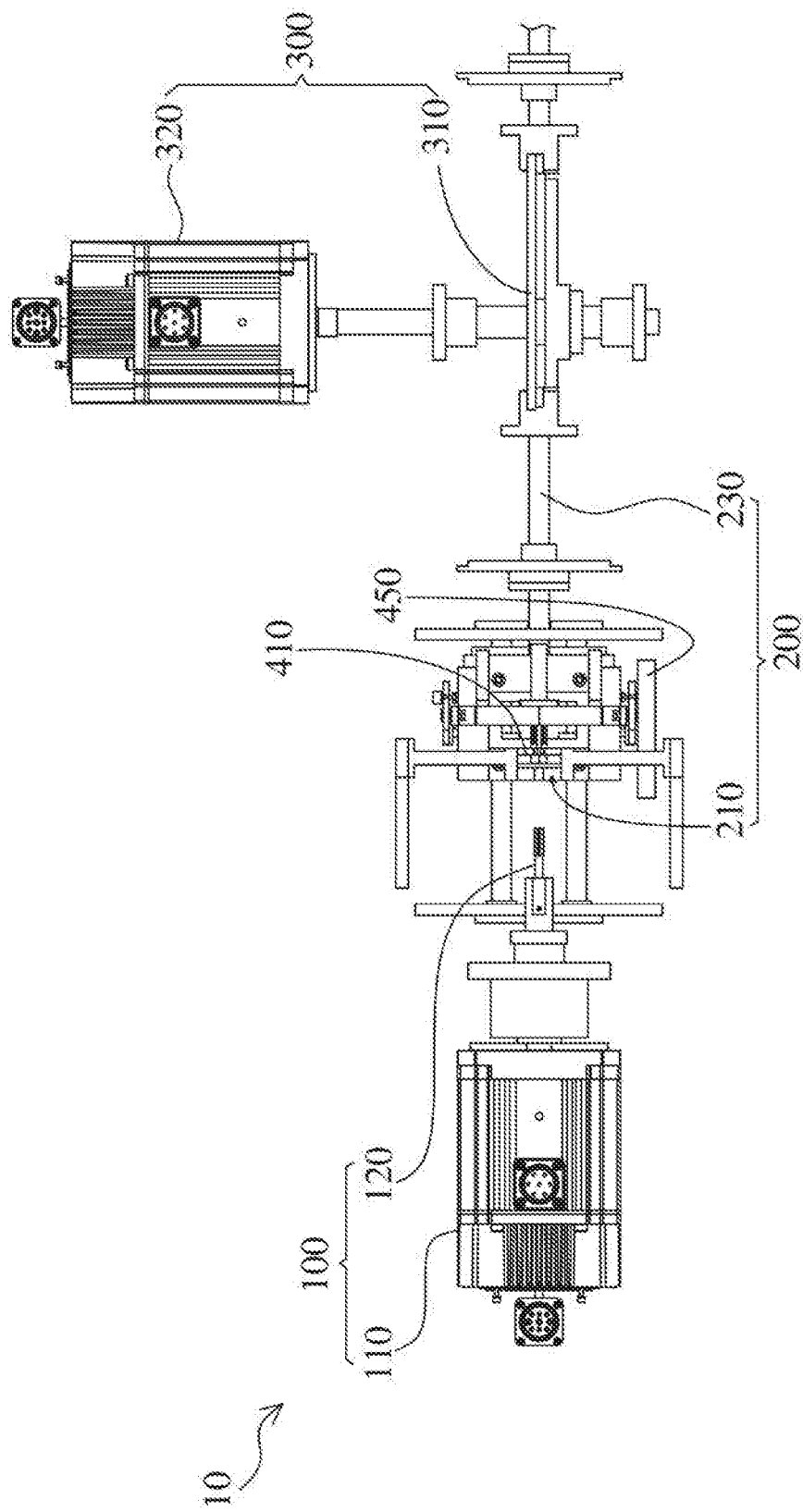
FIG. 1a is a schematic top view of an automatic nut tapping equipment according to an embodiment of the present disclosure.
Figure 1B:
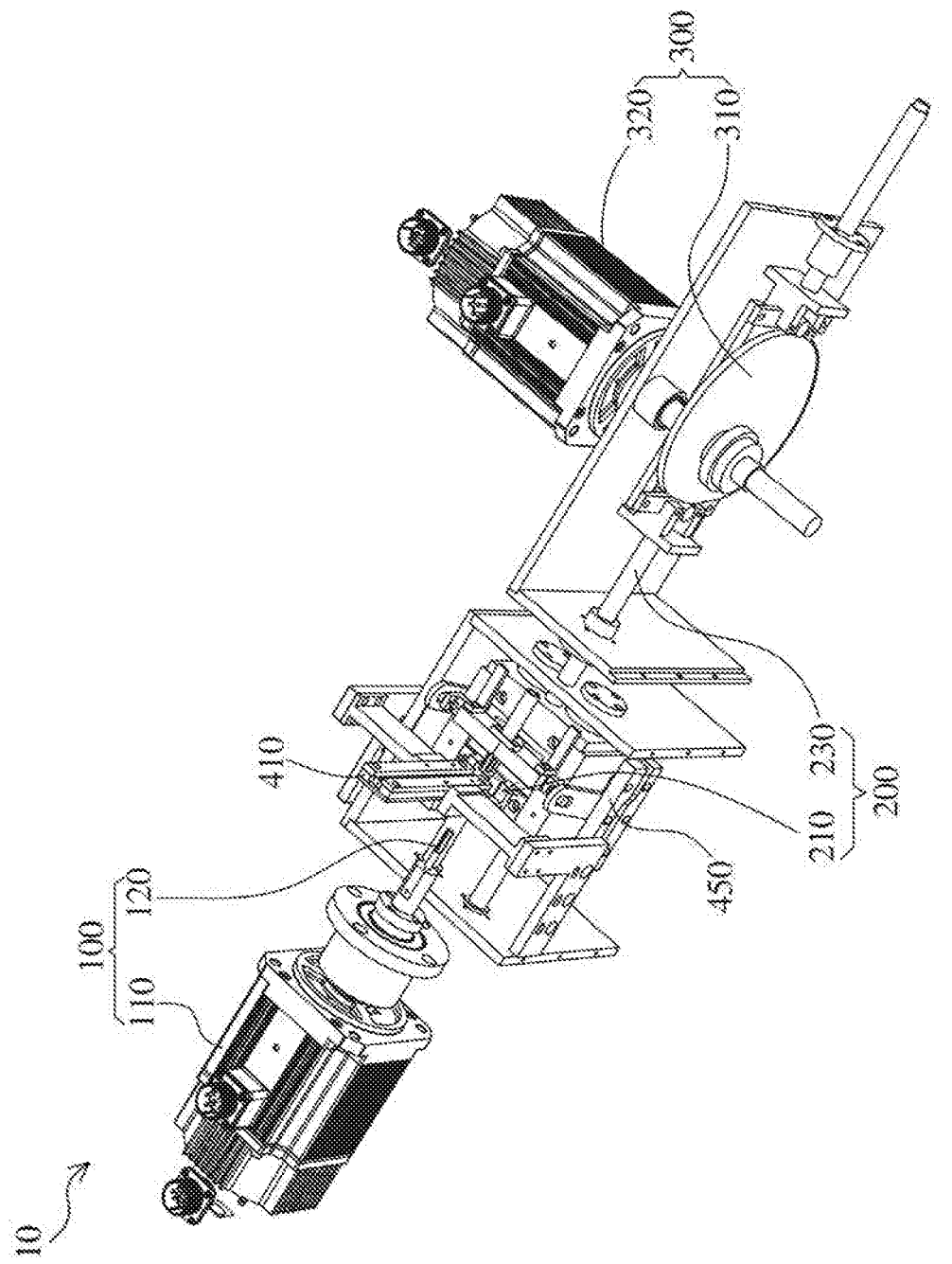
FIG. 1b is a schematic perspective view of the automatic nut tapping equipment in the embodiment of FIG. 1.
Figure 2:
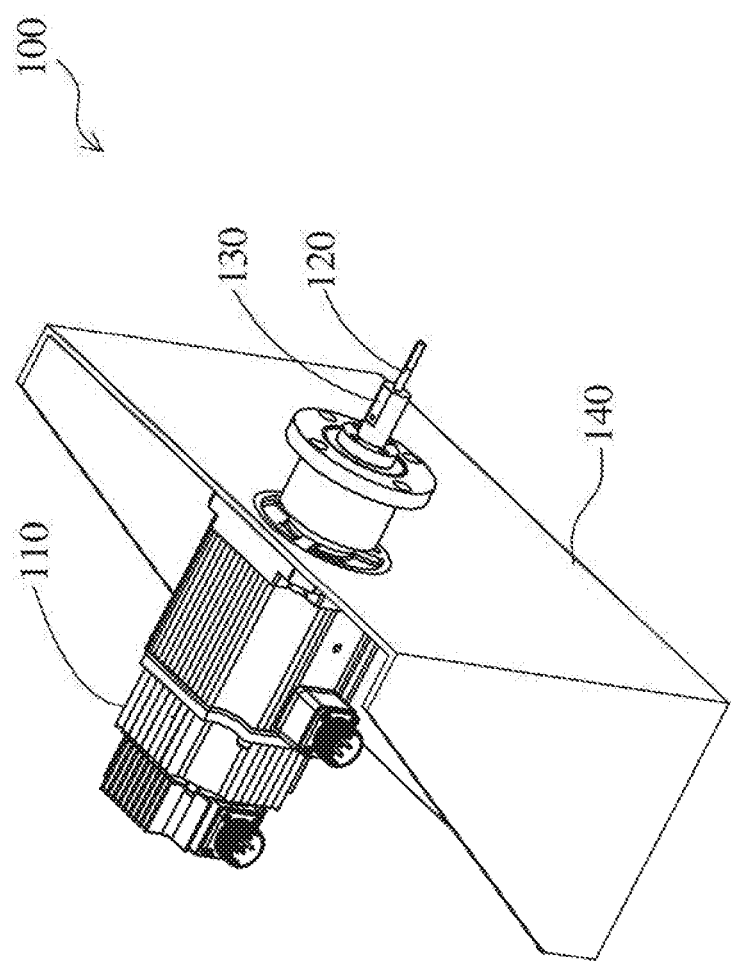
FIG. 2 is a schematic perspective view of a tap rotating mechanism in the embodiment of FIG. 1b.
Figure 3A:
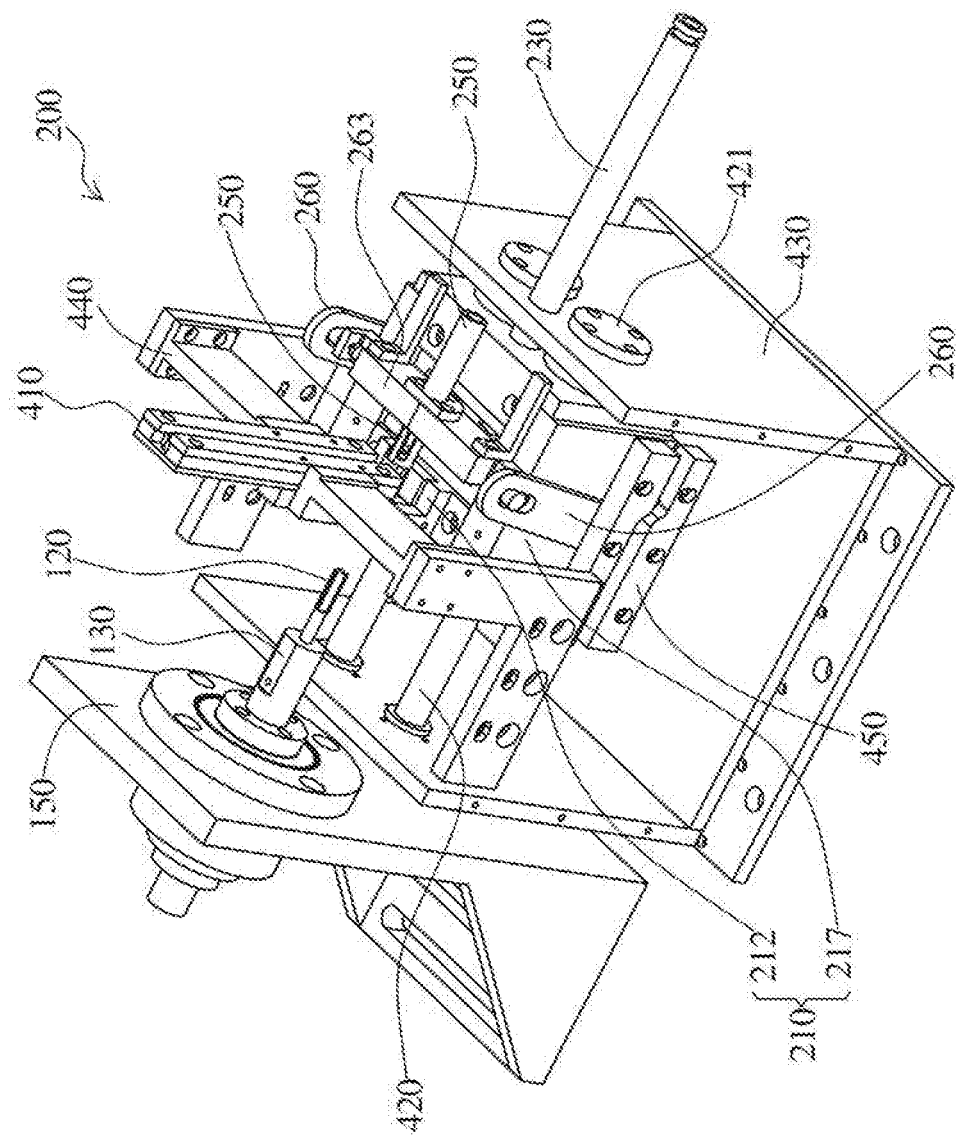
FIG. 3a is a schematic perspective view of a nut clamping mechanism in the embodiment of FIG. 1b.
Figure 3B:
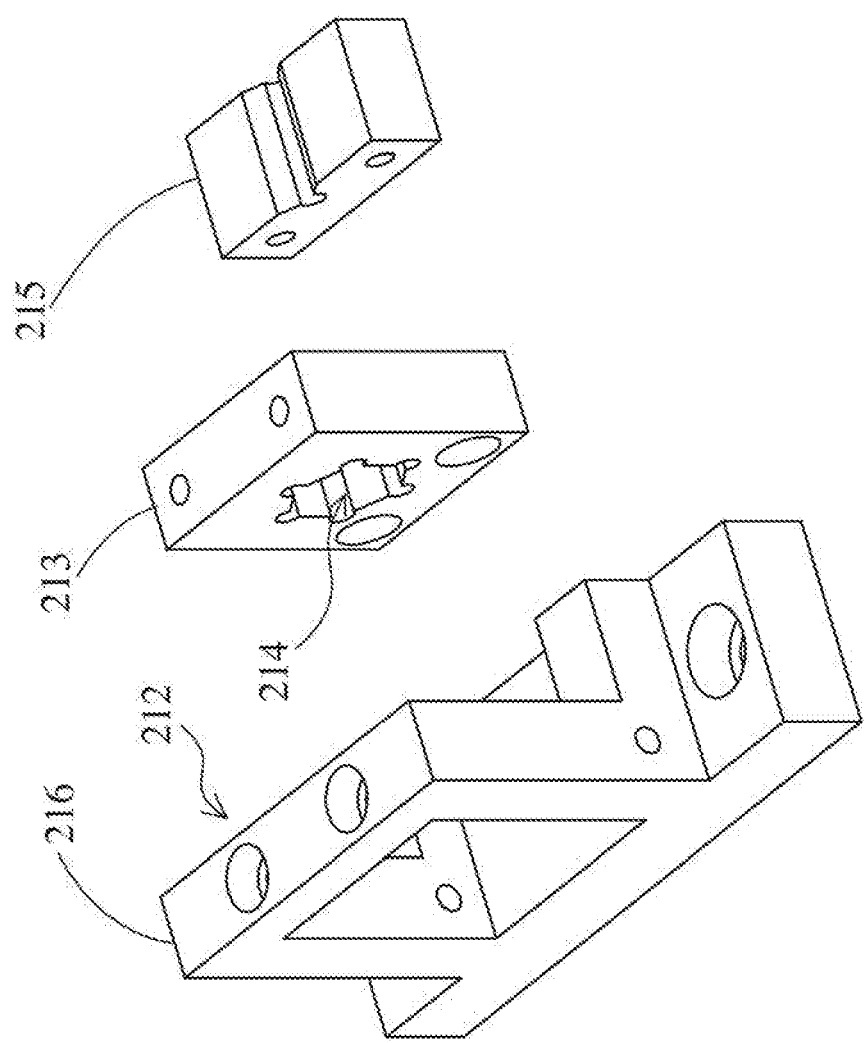
FIG. 3b is an exploded perspective view of a clamping portion in the embodiment of FIG. 1b.
Figure 4B:
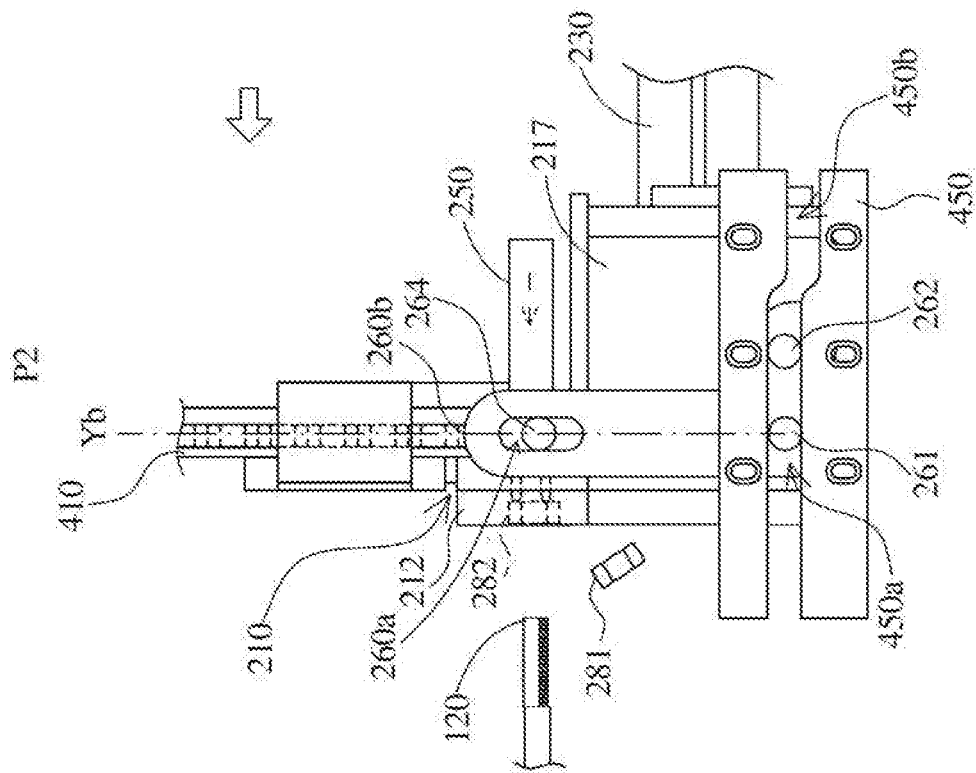
FIGS. 4a to 4g are schematic side views of the feeding and discharging of the nut in the embodiment of FIG. 1b.
Figure 4A:
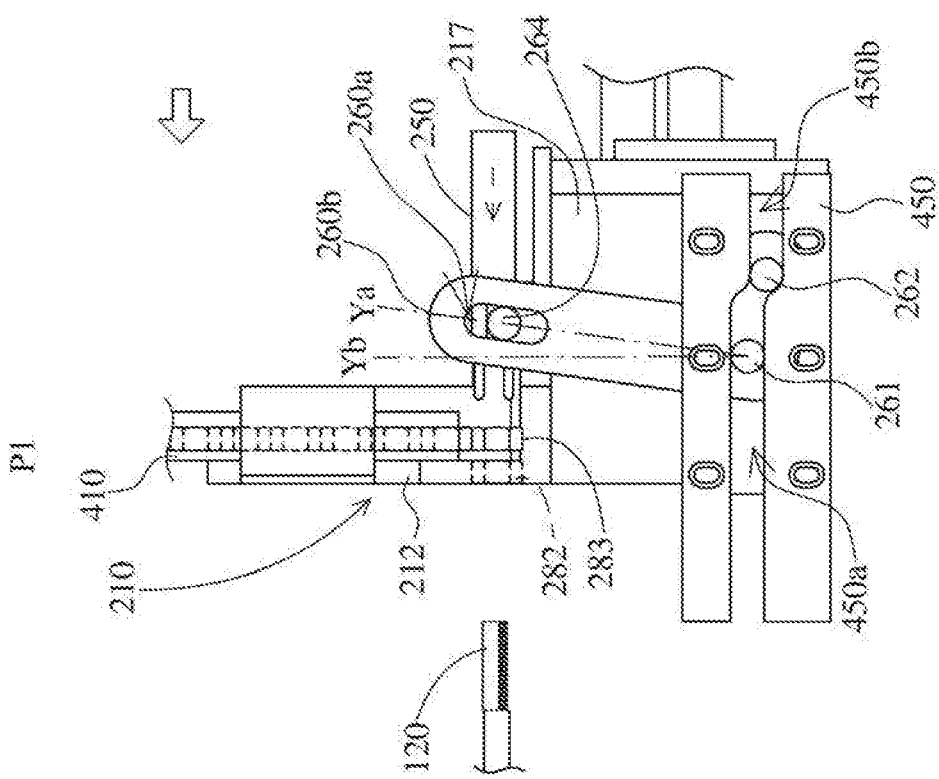
Figure 4C:
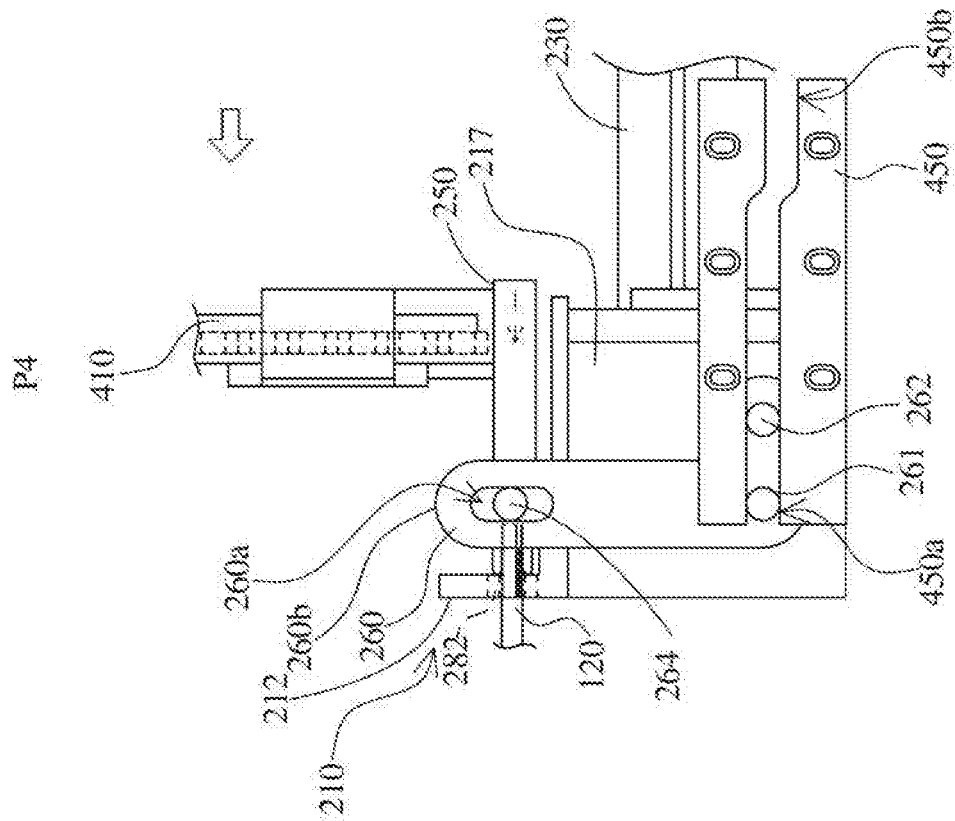
Figure 4D:
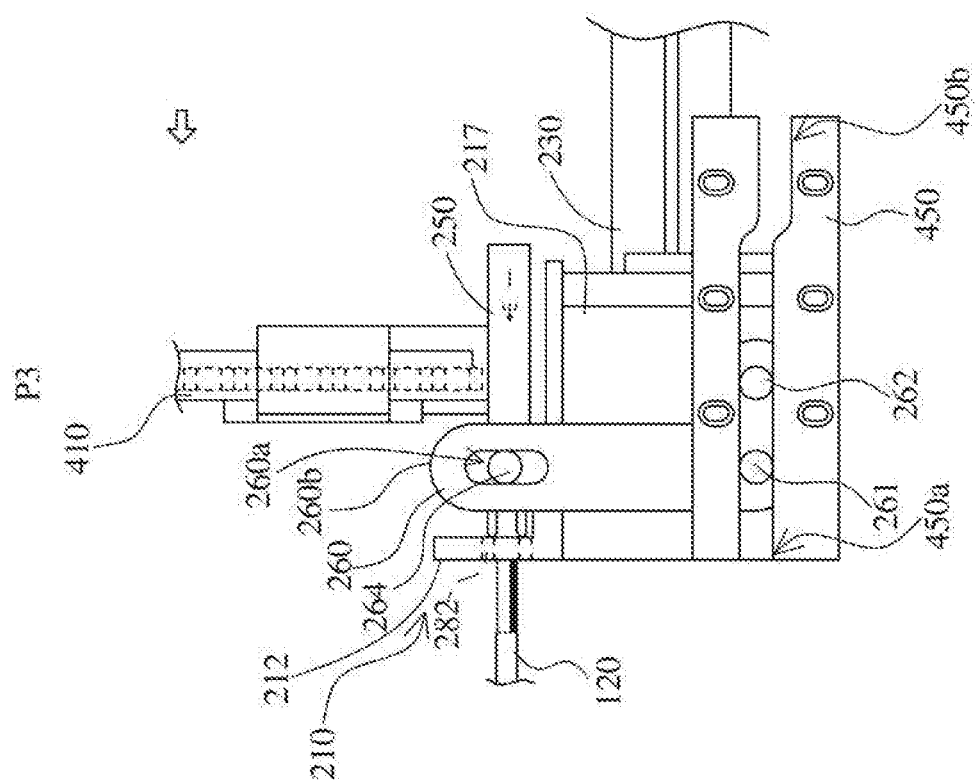
Figure 4F:
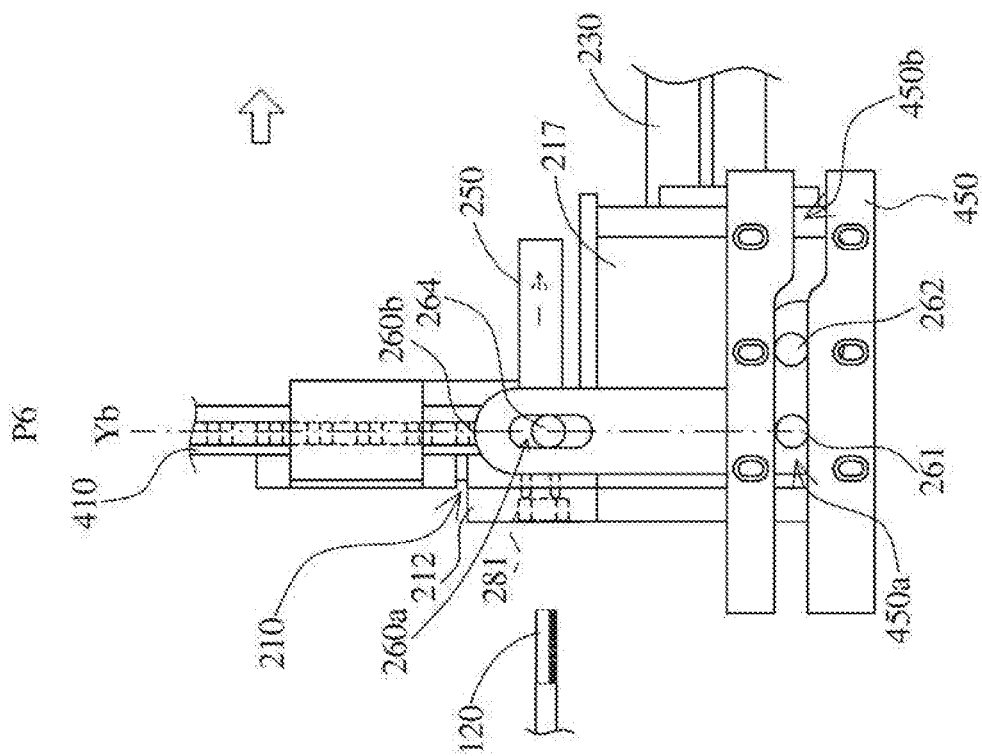
Figure 4E:
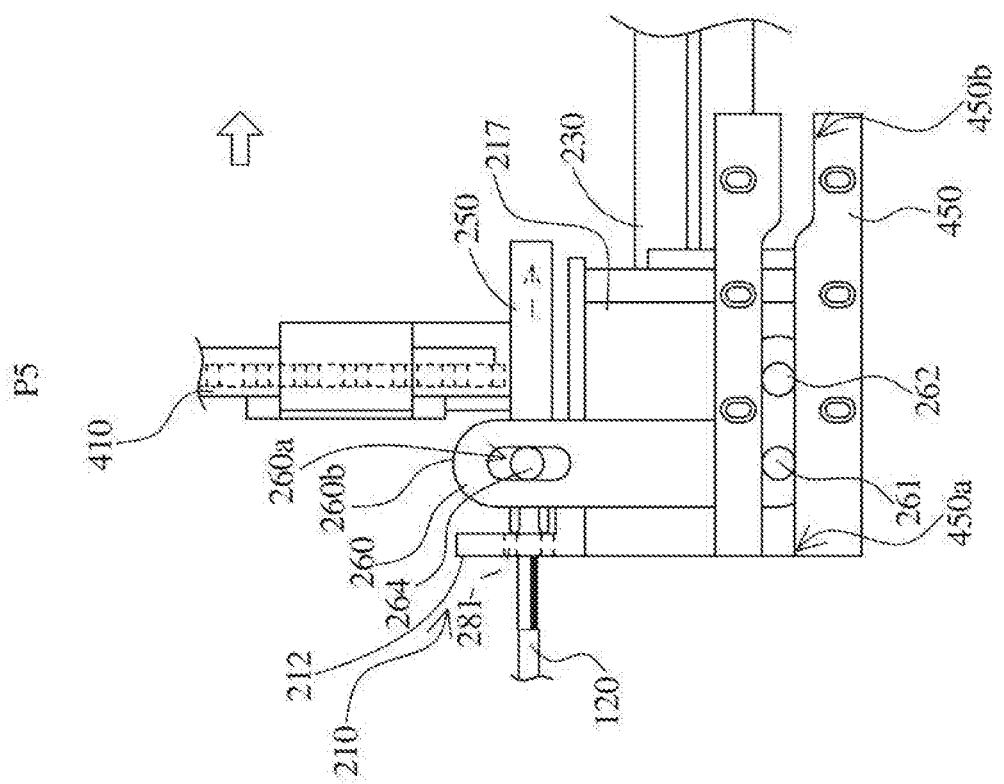
Figure 4G:
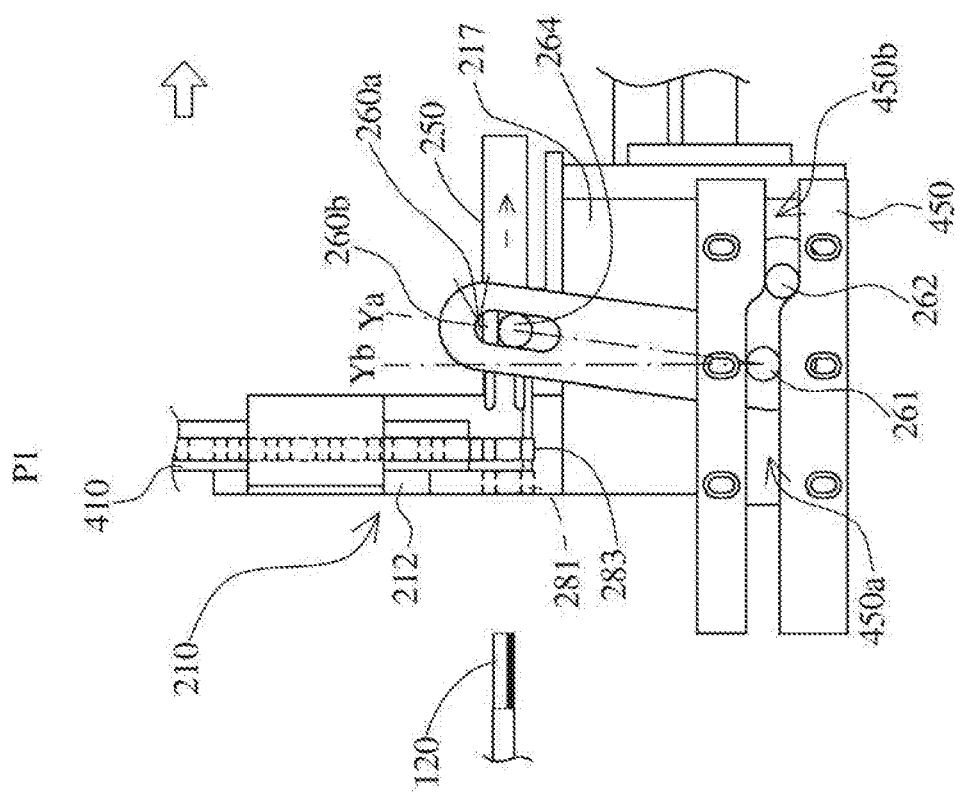
Figure 5:
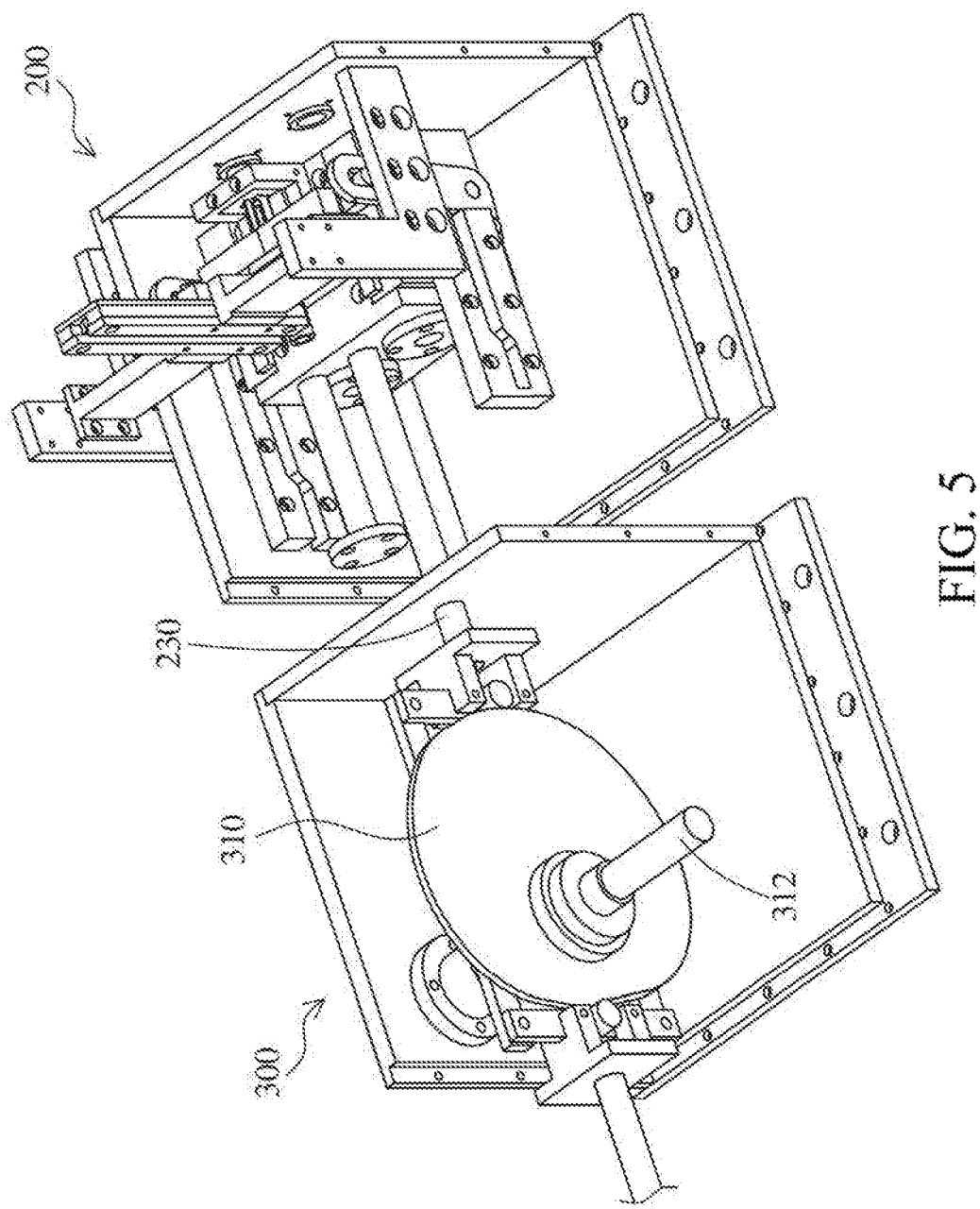
FIG. 5 is a schematic perspective view of an axial transmission mechanism in the embodiment of FIG. 1b.

Please refer to FIG. 1a to FIG. 5. FIG. 1a is a schematic top view of an automatic nut tapping equipment according to an embodiment of the present disclosure. FIG. 1b is a schematic perspective view of the automatic nut tapping equipment in the embodiment of FIG. 1. FIG. 2 is a schematic perspective view of a tap rotating mechanism in the embodiment of FIG. 1*b*. FIG. 3*a* is a schematic perspective view of a nut clamping mechanism in the embodiment of FIG. 1*b*. FIG. 3*b* is an exploded perspective view of a clamping portion in the embodiment of FIG. 1*b*. FIGS. 4*a* to 4*g* are schematic side views of the feeding and discharging of the nut in the embodiment of FIG. 1*b*. FIG. 5 is a schematic perspective view of an axial transmission mechanism in the embodiment of FIG. 1*b*.

As shown in FIG. 1*a* to FIG. 5, the embodiment provides an automatic nut tapping equipment 10 including a tap rotating mechanism 100, a nut clamping mechanism 200, an axial transmission mechanism 300, and a nut placing slot 410. The tap rotating mechanism 100 includes a tap rotary motor 110 and a tap 120, wherein the tap 120 is driven to rotate forward and reverse by the tap rotary motor 120. The tap 120 is rigidly clamped and is arranged to align a central axis of a to-be-tapped nut 281, wherein the tap 120 is driven by the tap rotary motor 110 to perform a rotary motion without a translational axial motion. The tap rotating mechanism 100 uses a rigid clamping member 130 to clamp the tap 120, wherein the rigid clamping member 130 may be a high-precision sleeve, a tapered sleeve, a three-jaw or a hydraulic jaw. In addition, a motor bracket 140 may be disposed to support the tap rotary motor 110, and a tap bracket 150 may be disposed to support the rigid clamping member 130 and the tap 120.

The nut clamping mechanism 200 is disposed opposite the tap 120, and the nut clamping mechanism 200 may include a clamping assembly 210, two guiding plate 450, a connecting rod 230, a nut placing slot 240, a push rod 250, two L-shaped lever 260, a push rod frame 263, and two sliding rail 420. The clamping assembly 210 is disposed on the sliding rail 420 and is coupled to the axial transmission mechanism, to axially move forward and backward. The clamping assembly 210 is configured for clamping the to-be-tapped nut 282 to restrict the to-be-tapped nut 282 from rotating.

The push rod 250 is disposed on the clamping assembly 210, and the push rod 250 is axially moved forward and backward along with the clamping assembly 210, such that the forward nut-tapping motion and the backward nut-retracting motion are finished, wherein the push rod 250 pushes the to-be-tapped nut 282 into the tap 120 for tapping and stops the dropping of the next to-be-tapped nut 283 in the nut placing slot 410 during the forward nut-tapping motion.

The L-shaped lever 260 is disposed on the nut clamping mechanism 200 through a pivot point 261, wherein a lever roller 262 at an end of the L-shaped lever 260 slides in the guiding plate 450, another end of the L-shaped lever 260 is coupled to the push rod 250 and is axially moved forward and backward along with the clamping assembly 210. For example, an oval hole 260*a* on the L-shaped lever cooperates with a push rod frame roller 264 of a push rod frame 263, so that the L-shaped lever 260 is coupled to the push rod 250. When the to-be-tapped nut 282 is tapped and retracted to a front edge of the nut placing slot 410, a swing of the L-shaped lever 260 at the pivot point 261 is caused by the guide plate 450, and then the backward movement of the push rod 250 is speeded, thereby allowing the dropping of another to-be-tapped nut 283 in the nut placing slot 410. After the dropping of another to-be-tapped nut 283, the L-shaped lever 260 is moved forward along with the clamping assembly 210, and then the push rod 250 is driven to push another to-be-tapped nut 283 moves forward. Each of the L-shaped levers 260 includes a pivot point 261 and a lever roller 262. The pivot point 261 is pivotally connected to a side of the sliding block 217, so that the L-shaped lever 260 can swing along the pivot point 261. The lever roller 262 is secured on an end of the L-shaped lever 260 and is located in the guiding plate 450, so that the clamping assembly 210 may move forward and backward along the guiding plate 450. The guiding plate 450 may further include a first stair guiding slot 450*a* and a second stair guiding slot 450*b*, wherein there is a stair step between the first stair guiding slot 450*a* and the second stair guiding slot 450*b*. Taking the direction shown in FIG. 4*a* as an example, the horizontal height of the first stair guiding slot 450*a* is different from the horizontal height of the first stair guiding slot 450*b*. It can also be said that the second stair guiding slot 450*b* is lower than the first stair guiding slot 450*a*. In addition, the lever roller 262 can move between the first stair guiding slot 450*a* and the first stair guiding slot 450*b*.

The clamping assembly 210 includes a clamping portion 212 and a sliding block 217. The clamping portion 212 is disposed on the sliding block 217, and the clamping portion 212 is configured to clamp the to-be-tapped nut from the nut placing slot 410. The clamping portion 212 includes a mold 213, and the mold 213 has a cavity 214. The cavity 214 restricts the to-be-tapped nut 282 in the cavity 214 from rotating during tapping, but allows the to-be-tapped nut 282 to move slightly, a front edge of the cavity 240 is provided with an anti-tilt guiding rail 215, the anti-tilt guiding rail 215 allows dropping of the to-be-tapped nut 282, and the to-be-tapped nut 282 is pushed into the cavity 214 by the push rod 250.

The guiding plate 450 includes a first stair guiding slot 450*a* and a second stair guiding slot 450*b* for swing the L-shaped lever 260. Taking the direction shown in FIG. 4*a* as an example, the horizontal height of the first stair guiding slot 450*a* is different from the horizontal height of the first stair guiding slot 450*b*. It can also be said that the second stair guiding slot 450*b* is lower than the first stair guiding slot 450*a*.

The axial transmission mechanism 300 is coupled to the clamping assembly 210, wherein the clamping assembly 210 is driven by the axial transmission mechanism 300 to axially translate, and the axial transmission mechanism 300 controls the clamping assembly 210 to axially translate one pitch when the tap 120 rotates one revolution, such that a forward nut-tapping motion and a backward nut-retracting motion are performed by the nut clamping mechanism 200. When the to-be-tapped nut 282 is moved to the last pitch of cutting edge on the tap 120 during the forward nut-tapping motion, the tap 120 is driven to rotate reversely by the tap rotary motor 110 and the backward nut-retracting motion is performed by the nut clamping mechanism 200. The tap rotary motor 110 is configured to drive the tap 120 to rotate in a first direction or a second direction. The tap rotary motor 110 drives the tap 120 to rotate in the first direction during tapping, and the tap rotary motor 110 drives the tap 120 rotates in the second direction during retracting.

Taking FIG. 3*a* as an example, the clamping assembly 210 is disposed on the sliding rail 420, and the clamping assembly 210 is configured to clamp the to-be-tapped nut. The clamping assembly 210 may include a clamping portion 212 and a sliding block 217. The clamping portion 212 is disposed on the sliding block 217, and the clamping portion 212 is configured to clamp the to-be-tapped nut from the nut placing slot 410. The clamping portion 212 prevents the to-be-tapped nut from being rotated by the tap 120 when tapping or retracting. The clamping portion 212 can use the mold to hold the to-be-tapped nut, thereby clamping the to-be-tapped nut and restricting the to-be-tapped nut from rotating. In addition, one or more brackets 440 fixed on a box 430 can be used to support the nut placing slot 410, and the sliding rail 420 can also be fixed on the box 430 through a sliding rail baffle 421. It should be understood that, in order to clearly illustrate the components in the drawings, part of the box 430 in FIG. 3a is not drawn. Taking FIG. 3b as an example, the clamping portion 212 may include a mold 213, an anti-tilt guiding rail 215 and a securing component 216. The mold 213, the anti-tilt guiding rail 215, and the securing component 216 are assembled to form the clamping portion 212. The mold 213 has a cavity 214 for receiving the to-be-tapped nut 283. The cavity 214 may be hexagonal or other suitable shapes. The anti-tilt guiding rail 215 is aligned with the cavity 214 on the mold 213, such that the to-be-tapped nut can smoothly enter the cavity 214. In addition, the anti-tilt guiding rail 215 can also prevent the to-be-tapped nut from tilting (angle offset) before entering the mold 213. The securing component 216 is detachably disposed on the sliding block 217. When tapping nuts in different sizes is need, only the mold 123 and the anti-tilt guiding rail 215 are replaced, greatly reducing the replacement time. In addition, the cavity 214 on the mold 213 cooperates with the to-be-tapped nut, so that the cavity 214 can hold the to-be-tapped nut and prevent the to-be-tapped nut from rotating. For example, there is a tolerance from 10 to 20 between the size of the cavity 214 and the size of the to-be-tapped nut, such that the to-be-tapped nut can smoothly enter the cavity 214, and the cavity 214 can effectively hold the to-be-tapped nut. It should be understood that the clamping portion 212 assembled by the mold 213, the anti-tilt guiding rail 215, the securing component 216 is a feasible example, and the clamping portion 212 may also be formed by using other design to prevent the to-be-tapped nut from being rotated by the tap 120. Two guiding plates 450 are fixed on the frame and are located on both sides of the sliding block 217, and the sliding block 217 moves along the two guiding plates 450. In addition, the positions of the two guiding plates 450 are fixed. For example, the two guiding plates 450 can be fixedly disposed on the box 430 or other similar designs.

The connecting rod 230 is connected to the clamping assembly 210 and the axial transmission mechanism 300, and the connecting rod 230 is driven by the axial transmission mechanism 300 to reciprocate the clamping assembly 210 in the axial direction along the slide rail 420. The nut placing slot 410 is configured to accommodate the to-be-tapped nuts, the push rod 250 is configured to push the to-be-tapped nuts accommodating in the nut placing slot into the clamping portion 212 of the clamping assembly 210. In addition, during the tapping process, the push rod 250 abuts against the to-be-tapped nut, thereby preventing the to-be-tapped nut form retracting and affecting the quality of tapping.

Taking FIG. 4a to FIG. 4g as an example, in FIG. 4a, the lever roller 262 is located in the lower portion of the guiding plate 450 (that is, the second stair guiding slot 450b), and the L-shaped lever 260 pushes the push rod 250 to the right endpoint position. At this moment, the nut placing slot 410 feeds the nut to the anti-tilt guiding rail 215, and the axial transmission mechanism 300 returns to the right side. At this time, it can be said that the clamping assembly 210 is located at the first position P1.

Subsequently, as shown in FIG. 4b, the axial transmission mechanism 300 drives the clamping assembly 210 to move toward the left. The lever roller 262 then moves to the left along with the pivot point 261, and the lever roller 262 moves from the lower portion to the upper portion of the guiding plate 450 (that is, from the second stair guiding slot 450b to the first stair guiding slot 450a), thereby driving the L-shaped lever 260 to swing counterclockwise. The push rod frame roller 264 rolls in an oval hole 260a on L-shaped lever, thereby driving the push rod frame 263 to move the push rod 250 toward the left. The push rod 250 then pushes the to-be-tapped nut 283 into the mold 213 along the anti-tilt guiding rail 215, and the tapped nut 281 in the mold 213 is pushed out of the mold 213 to complete the discharge, at the same time. At this moment, the clamping assembly 210 is located at a second position P2. During this period (that is, the period during which the clamping assembly 210 moves from the first position P1 to the second position P2), the push rod 250 is faster than the axial transmission mechanism 300. When the push rod 250 moves to the left, the push rod 250 stops the to-be-tapped nuts dropping from the nut placing slot 410. Refer to FIG. 4a and FIG. 4b for the counterclockwise swing of the L-shaped lever 260. That is, the extension line Ya from the pivot point 261 to the end 260b of the L-shaped lever 260 swings to the extension line Yb around the pivot point 261. It should be understood that some suitable components may be disposed to collect the tapped nut 281 being pushed out.

Next, the axial transmission mechanism 300 keeps pushing toward the left at a constant speed, and the push rod 250 abuts against and pushes the to-be-tapped nut to move toward the left and to contact to the tap 120. During this period, the lever roller 262 is located in the first stair guiding slot 450 of the guiding plate 450, and the L-shaped lever 260 is kept in the same posture without swing.

As shown in FIG. 4c, the clamping assembly 210 is at the third position P3, that is, the to-be-tapped nut contacts to the tap 120. Theoretically, the to-be-tapped nut 282 may move backward, but the push rod 250 abuts against the to-be-tapped nut 282, such that the to-be-tapped nut 282 can smoothly enter the tap 120 for tapping.

During this period (i.e., during the tapping), the mold 213 restricts the to-be-tapped nut 282 from being rotated by the tap 120, but the tap 120 moves axially for tapping. During this period, the axial transmission mechanism 300 keep pushing toward the left at a constant speed, and is necessary to keep the mod contact with the to-be-tapped nut 282 or keep a small gap between thereof. Otherwise, a rough internal thread may be generated and the quality of the internal thread may be affected.

As shown in FIG. 4d, the clamping assembly 210 is located at the fourth position P4, that is, the to-be-tapped nut 282 is subjected to tapping and shaping. When the to-be-tapped nut 282 overlaps the tap by only one pitch, the to-be-tapped nut 282 still in the mold 213 and maintains the right position to the tap 120 without being tilted. At this time, the tap 120 stops and rotates reversely, and the axial transmission mechanism 300 reverses with the rotation of the plate cam 310. There is a speed difference between thereof, the to-be-tapped nut 282 moves axially with the tap 120, and the mold 213 moves axially with the axial transmission mechanism 300, such that the to-be-tapped nut 282 slightly moves with respect to the mold 120 within the mold 120.

During this period (that is, during the retracting period), the to-be-tapped nut 282 that has completed tapping (hereinafter referred to as the tapped nut 281) is retracted to the right with the mold 213. The axial transmission mechanism 300 drives the mold 213 to move to the right at a constant speed. The mold 213 needs to keep contact with the tapped nut 281 or keep a small gap between thereof, otherwise, the tapped nut 281 and the tap 120 may be interfered with and collided with each other.

As shown in FIG. 4e, the clamping assembly 210 is located at the fifth position P5, the tapped nut 281 is completely separated from the tap 120 and is moved to the right at a constant speed.

Then, as shown in FIG. 4f, the clamping assembly 210 is located at the sixth position P6, the axial transmission mechanism 300 still drives the mold 213 to move to the right at a constant speed.

Next, as shown in FIG. 4g, the lever roller 262 moves to the right with the pivot point 261, and the lever roller 262 moves from the upper portion to the lower portion of the guiding plate 450 (that is, from first stair guiding slot 450a to the second stair guiding slot 450b), thereby driving the L-shaped lever 260 to swing clockwise. The push rod frame roller 264 rolls in the oval hole 260a on L-shaped lever, thereby driving the push rod frame 263 to move the push rod 250 toward the right. When the push rod 250 is behind the nut placing slot 410, there is a space for the next to-be-tapped nut 283 to drop. That is, the clamping assembly 210 returns to the first position P1. Refer to FIG. 4g for the clockwise swing of the L-shaped lever 260. The extension line Yb from the pivot point 261 to the end 260b of the L-shaped lever 260 returns to the extension line Ya.

As shown in FIG. 5, the axial transmission mechanism 300 may include a plate cam 310 and a cam driving motor 320. The plate cam 310 is coupled to the connecting rod 230, and the plate cam 310 is driven to rotate by the cam driving motor 320. The plate cam 310 includes a cam shaft 312. The cam shaft 312 is coupled to the cam driving motor 320 and is driven by the cam driving motor 320 (refer to FIG. 1a and FIG. 1b), so that the plate cam 310 rotates around the cam shaft 312. In this way, the plate cam 310 is driven by the cam driving motor 320 to rotate, and the connecting rod 230 is driven by the plate cam 310, such that the clamping assembly 210 of the nut clamping mechanism 200 is moved back and forth in the axial direction. The cooperation of the plate cam 310 and the cam driving motor 320 can provide higher thrust, thereby allowing the tapping to proceed smoothly.

It should be understood that the axial transmission mechanism 300 may include a linear motor (not shown), an electric cylinder, a lead screw, a hydraulic/pneumatic mechanism or a cam mechanism. The linear motor is directly coupled to the connecting rod 230. The use of the linear motor can precisely control the clamping assembly to reciprocate in the axial direction. In addition, the speed of the clamping assembly matches that of the tap. That is, during the tapping process and the retracting process, the rotating speed of the tap cooperates with the moving speed of the clamping assembly, such as when the tap rotates one revolution, the nut is moved one pitch (be tapped one pitch or be retracted one pitch). Furthermore, the time point for controlling the reversal of the tap is when the nut is moved to the last pitch of cutting edge on the tap. That is, when the nut and the tap overlap each other by only one pitch, the nut and the tap perform reverse movements. This can prevent the secondary tapping during the retracting process.

In summary, the embodiment of the present disclosure is an automatic nut tapping equipment with high rigidity and high precision for forming the internal thread of a nut, and the automatic nut tapping equipment includes a tap rotating mechanism, a nut clamping mechanism, an axial transmission mechanism and a nut dropping module (i.e. the nut placing slot). The jib of the tap rotating mechanism is short and is rigidly clamped, which improves the torsional rigidity of the tap, such that no vibration occurs. The nut clamping mechanism drives the nut to axially move forward and backward, to complete the tapping and retracting. Wherein, the moving speed of the clamping assembly cooperates with the rotating speed of the tap. That is, when the tap rotates one revolution, the nut is moved one pitch. In addition, when the nut and the tap overlap each other only by one pitch, the nut and the tap perform reverse movements to prevent the secondary tapping. The sliding block of the clamping assembly is located in the front of the axial transmission mechanism and is supported by two sliding rails, and the axially translates along with the axial transmission mechanism. When the sliding block moves forward, the push rod pushes the nut into the hexagonal cavity and stops the next nut from dropping. When the sliding block moves backward, the push rod is speeded to leave the tapped nut, and, therefore, a space is generated therebetween for the dropping of the next nut. Then, when the axial transmission mechanism pushes forwards, the push rod pushes the nest nut into the hexagonal cavity, stops the nut from dropping, and pushes the tapped nut to complete the discharge. The hexagonal cavity restricts the nut from rotating during the tapping, but allows the nut to axially move slightly. Therefore, the embodiment of the present disclosure only needs to keep the nut from leaving the hexagonal cavity, and then the tapping can be performed automatically without precise control.

As described above, in the embodiment of the present disclosure, the nut clamping mechanism is driven to reciprocate in the same axial direction by the axial transmission mechanism. During the reciprocating movement, the nut tapping is completed, that is, an internal thread is formed in the nut. In the embodiment of the present disclosure, the tap only rotates and the jib is short, which can improve the rigidity of the tap, thereby preventing the tap from vibrating during rotating. In addition, the clamping portion (such as the mold) is configured to clamp the nut, to restrict the nut from rotating during the tapping or the retracting. The tapping process is completed under that the rotating speed of the tap and the moving speed of the nut are controlled. The L-shaped lever and the push rod coupled to the L-shaped lever are configured to perform the feeding and discharging of the nut, thereby achieving a continuous automatic tapping. Because the tap is fixed and does not move back and forth, the tilt of the tap can be avoided, and the accuracy of the tapping can be effectively improved. Furthermore, because the tap is fixed and does not move back and forth, the length of the tap shank can be shortened, and the shaft diameter of the tap shank can be thickened. In this way, there is a better torsional rigidity during the tapping process, such that the vibration of the tap can be avoided or reduced, and the accuracy of the tapping can be improved.

In view of the above, although the present invention has been disclosed by way of preferred embodiments, the above preferred embodiments are not intended to limit the present invention, and one of ordinary skill in the art, without departing from the spirit and scope of the invention, the scope of protection of the present invention is defined by the scope of the claims.

What is claimed is:

1. An automatic nut tapping equipment, comprising:
a tap rotating mechanism comprising a tap rotary motor and a tap, wherein the tap is driven to rotate forward and reverse by the tap rotary motor, the tap is rigidly clamped and is arranged to align a central axis of a to-be-tapped nut, and the tap is driven by the tap rotary motor to perform a rotary motion without a translational axial motion;

a nut clamping mechanism disposed opposite the tap, wherein the nut clamping mechanism comprises a clamping assembly and a sliding rail, the clamping assembly is disposed on the sliding rail to axially move forward and backward, and the clamping assembly is configured for clamping the to-be-tapped nut to restrict the to-be-tapped nut from rotating;

an axial transmission mechanism coupled to the clamping assembly, wherein the clamping assembly is driven by the axial transmission mechanism to axially translate, and the axial transmission mechanism controls the clamping assembly to axially translate one pitch in response to the tap rotating one revolution, such that a forward nut-tapping motion and a backward nut-retracting motion are performed by the nut clamping mechanism; and a nut placing slot configured to arrange and control dropping of another to-be-tapped nut;

wherein the nut clamping mechanism comprises a push rod, a lever, a cavity, and a guiding plate; and the push rod is disposed on the clamping assembly, and the push rod is axially moved forward and backward along with the clamping assembly, such that the forward nut-tapping motion and the backward nut-retracting motion are finished, wherein the push rod pushes the to-be-tapped nut into the tap for tapping and stops the dropping of another to-be-tapped nut in the nut placing slot during the forward nut-tapping motion;

the lever is disposed on the nut clamping mechanism through a pivot point, an end of the lever slides in the guiding plate, another end of the lever is coupled to the push rod and is axially moved forward and backward along with the clamping assembly;

in response to the to-be-tapped nut tapped and retracted to a front edge of the nut placing slot, a swing of the lever at the pivot point is caused by the guide plate, and then the backward movement of the push rod is speeded, thereby allowing the dropping of another to-be-tapped nut in the nut placing slot, after the dropping of another to-be-tapped nut, the lever is moved forward along with the clamping assembly, and then the push rod is driven to push another to-be-tapped nut moves forward;

the cavity restricts the to-be-tapped nut in the cavity from rotating during tapping, but allows the to-be-tapped nut to move slightly, a front edge of the cavity is provided with an anti-tilt guiding rail, the anti-tilt guiding rail allows dropping of the to-be-tapped nut, and the to-be-tapped nut is pushed into the cavity by the push rod, and the guiding plate comprises a guiding slot for swinging the lever.

2. The automatic nut tapping equipment according to claim 1, wherein the tap rotating mechanism uses a high-precision sleeve, a tapered sleeve, a three-jaw or a hydraulic jaw to rigidly clamp the tap.

3. The automatic nut tapping equipment according to claim 1, wherein in response to the to-be-tapped nut moved to a last pitch of cutting edge on the tap during the forward nut-tapping motion, the tap is driven to rotate reversely by the tap rotary motor and the backward nut-retracting motion is performed by the nut clamping mechanism.

4. The automatic nut tapping equipment according to claim 1, wherein the tap rotary motor is configured to drive the tap to rotate in a first direction or a second direction, the tap rotates in the first direction during tapping, and the tap rotates in the second direction during retracting.

5. The automatic nut tapping equipment according to claim 1, wherein the axial transmission mechanism comprises a plate cam and a cam driving motor, the plate cam is coupled to a connecting rod, and the plate cam is driven to rotate by the cam driving motor.

6. The automatic nut tapping equipment according to claim 1, wherein the axial transmission mechanism is a linear motor, an electric cylinder, a lead screw, a hydraulic/pneumatic mechanism or a cam mechanism.

7. An automatic nut tapping equipment, comprising:
a tap rotating mechanism comprising a tap rotary motor and a tap, wherein the tap is driven to rotate forward and reverse by the tap rotary motor;

a nut clamping mechanism disposed opposite the tap, wherein the nut clamping mechanism comprises a clamping assembly and a sliding rail, the clamping assembly is disposed on the sliding rail and is configured for clamping a to-be-tapped nut to restrict the to-be-tapped nut from rotating;

an axial transmission mechanism coupled to the clamping assembly, wherein the clamping assembly is driven by the axial transmission mechanism to axially translate, and the axial transmission mechanism controls the clamping assembly to axially translate one pitch in response to the tap rotating one revolution, such that a forward nut-tapping motion and a backward nut-retracting motion are performed by the nut clamping mechanism; and a nut placing slot configured to arrange and control the dropping of another to-be-tapped nut.

8. The automatic nut tapping equipment according to claim 7, wherein the nut clamping mechanism further comprises a push rod, an L-shaped lever, a cavity, and a guiding plate, and the push rod is disposed on the clamping assembly, and the push rod is axially moved forward and backward along with the clamping assembly, such that the forward nut-tapping motion and the backward nut-retracting motion are finished, wherein the push rod pushes the to-be-tapped nut into the tap for tapping and stops the dropping of another to-be-tapped nut in the nut placing slot during the forward nut-tapping motion;

the L-shaped lever is disposed on the nut clamping mechanism through a pivot point, an end of the L-shaped lever slides in the guiding plate, another end of the L-shaped lever is coupled to the push rod and is axially moved forward and backward along with the clamping assembly, when the to-be-tapped nut is tapped and retracted to a front edge of the nut placing slot, a swing of the L-shaped lever at the pivot point is caused by the guide plate, and then the backward movement of the push rod is speeded, thereby allowing the dropping of another to-be-tapped nut in the nut placing slot, after the dropping of another to-be-tapped nut, the L-shaped lever is moved forward along with the clamping assembly, and then the push rod is driven to push another to-be-tapped nut moves forward;

the cavity restricts the to-be-tapped nut in the cavity from rotating during tapping, but allows the to-be-tapped nut to move slightly; and the guiding plate comprises a guiding slot for swinging the lever.

9. The automatic nut tapping equipment according to claim 8, wherein the tap is rigidly clamped and is arranged to align a central axis of the to-be-tapped nut, and the tap is driven by the tap rotary motor to perform a rotary motion without a translational axial motion.

10. The automatic nut tapping equipment according to claim 7, wherein the tap rotary motor is configured to drive the tap to rotate in a first direction or a second direction, the tap rotates in the first direction during tapping, and the tap rotates in the second direction during retracting.

\* \* \* \* \*